(12) United States Patent
An

(10) Patent No.: US 8,164,892 B2
(45) Date of Patent: Apr. 24, 2012

(54) MOBILE TERMINAL

(75) Inventor: Hyun Woo An, Seoul (KR)

(73) Assignee: Bluebird Soft Co., Ltd. (KR)

( * ) Notice: Subject to any disclaimer, the term of this patent is extended or adjusted under 35 U.S.C. 154(b) by 368 days.

(21) Appl. No.: 12/515,315

(22) PCT Filed: Nov. 2, 2007

(86) PCT No.: PCT/KR2007/005535
§ 371 (c)(1),
(2), (4) Date: May 18, 2009

(87) PCT Pub. No.: WO2008/060057
PCT Pub. Date: May 22, 2008

(65) Prior Publication Data
US 2010/0047679 A1 Feb. 25, 2010

(30) Foreign Application Priority Data

Nov. 17, 2006 (KR) .................. 10-2006-0113837

(51) Int. Cl.
G06F 1/16 (2006.01)
(52) U.S. Cl. ................ 361/679.33; 345/418; 360/246.2; 248/636
(58) Field of Classification Search .................. 345/169, 345/179, 173, 168, 171, 418; 455/556.2, 455/575.1, 90.3, 41.3; 713/2, 100, 300; 340/10.1, 340/5.6, 539.11; 347/222; 73/300; 361/679.01, 361/679.02, 679.34, 679.33, 679.37, 679.6, 361/679.35, 679.31, 679.27, 679.36, 679.54; 248/311.2, 310, 636, 652, 316.1, 570, 615
See application file for complete search history.

(56) References Cited

U.S. PATENT DOCUMENTS

| 2004/0229114 | A1 | 11/2004 | Liang et al. |
| 2005/0003860 | A1 | 1/2005 | Jung |
| 2005/0225933 | A1 | 10/2005 | Kang et al. |
| 2005/0229698 | A1* | 10/2005 | Beecroft et al. ................ 73/300 |
| 2006/0209177 | A1 | 9/2006 | Kim et al. |
| 2011/0063399 | A1* | 3/2011 | Tsuchiya et al. .............. 347/222 |

FOREIGN PATENT DOCUMENTS

| EP | 1760997 | 3/2007 |
| GB | 2340296 | 2/2000 |
| KR | 10-2006-0110960 | 10/2006 |

OTHER PUBLICATIONS

Extended European Search Report for Application No. 07833843.1-2411/2089978 dated Sep. 30, 2010.
International Search Report for PCT/KR2007/005535 dated Jan. 28, 2008.
Written Opinion for PCT/KR2007/005535 dated Jan. 28, 2008.

* cited by examiner

Primary Examiner — Hung Duong
(74) Attorney, Agent, or Firm — Cantor Colburn LLP

(57) ABSTRACT

A mobile terminal includes a casing having a battery accommodation portion where a battery is installed and a battery stopper accommodation groove is recessively formed in a side thereof, a battery cover detachably coupled to the casing to cover the battery accommodation portion and having a cover knob accommodation groove that is formed by penetrating an area thereof, and a cover and battery stopper installed in the casing and having a side that is hook coupled to and released from the cover knob accommodation groove and the other side that is forcibly coupled to and released from the battery stopper accommodation groove by being engaged with the operation of the side that is hook coupled to and released from the cover knob accommodation groove.

7 Claims, 7 Drawing Sheets

[Figure 1]
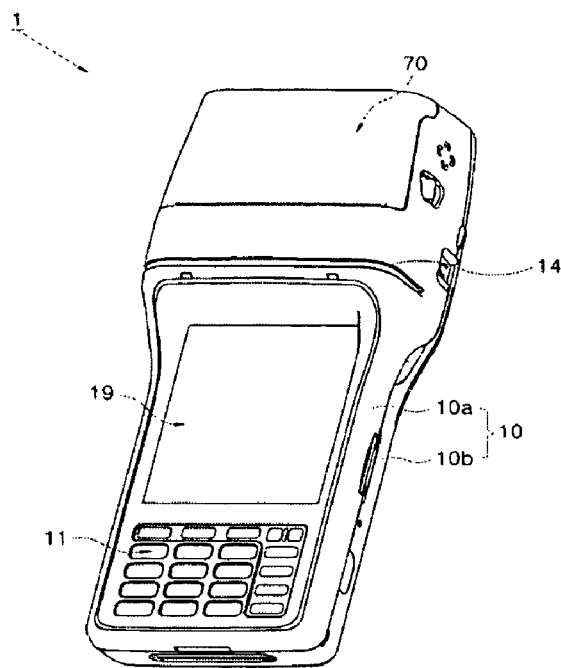
[Figure 2]
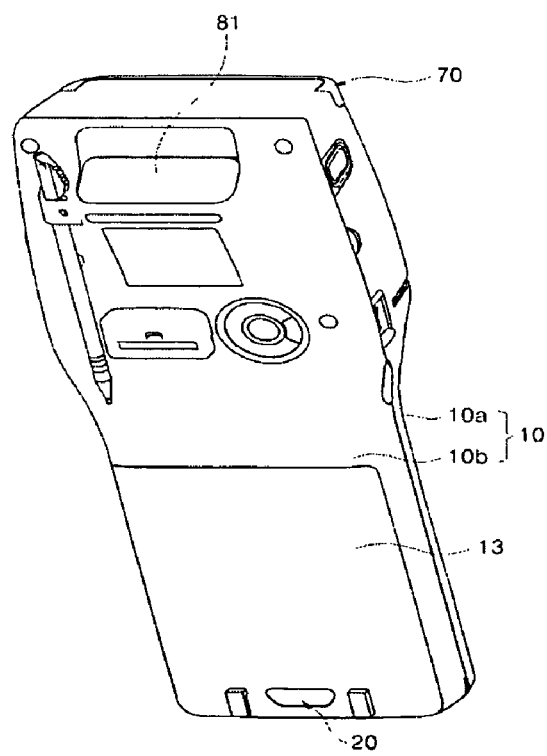

[Figure 3]
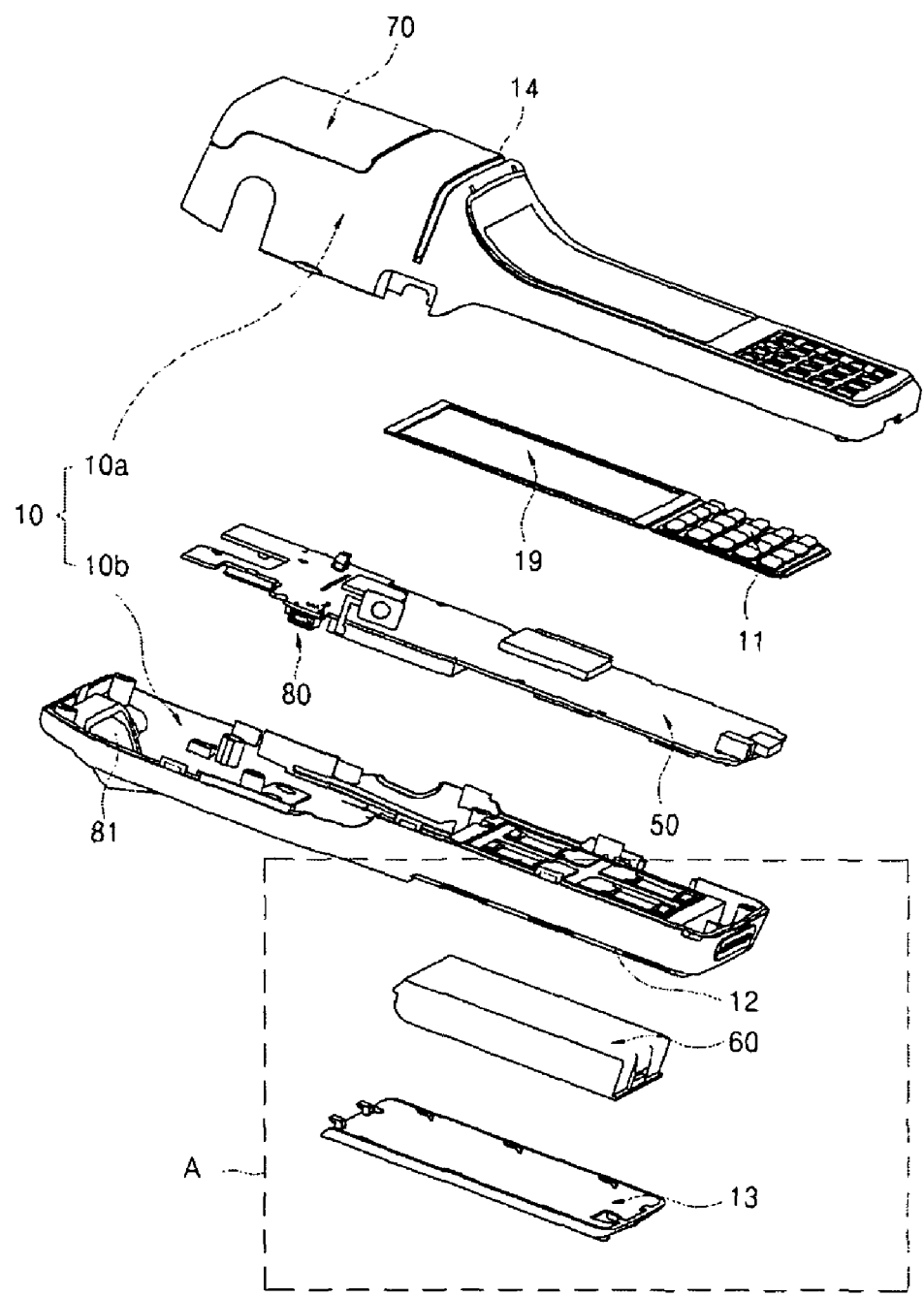

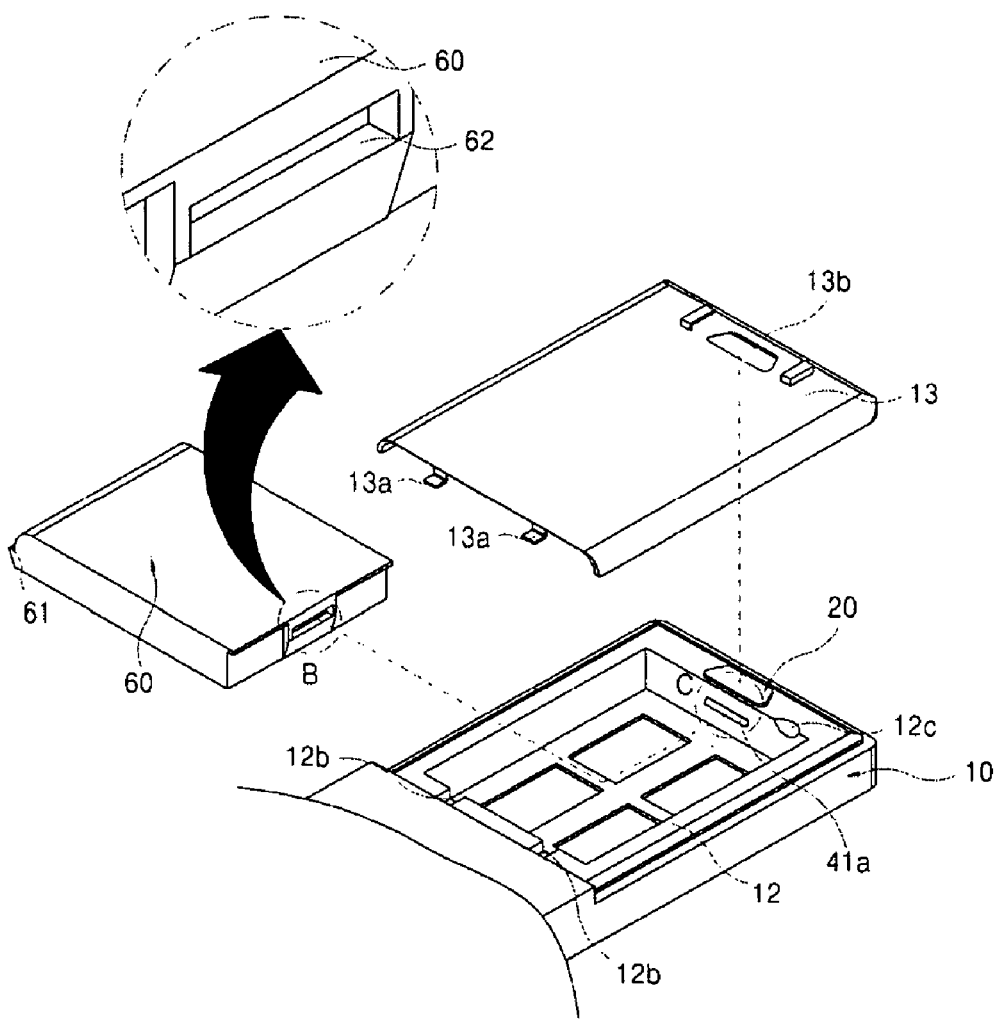
[Figure 4]

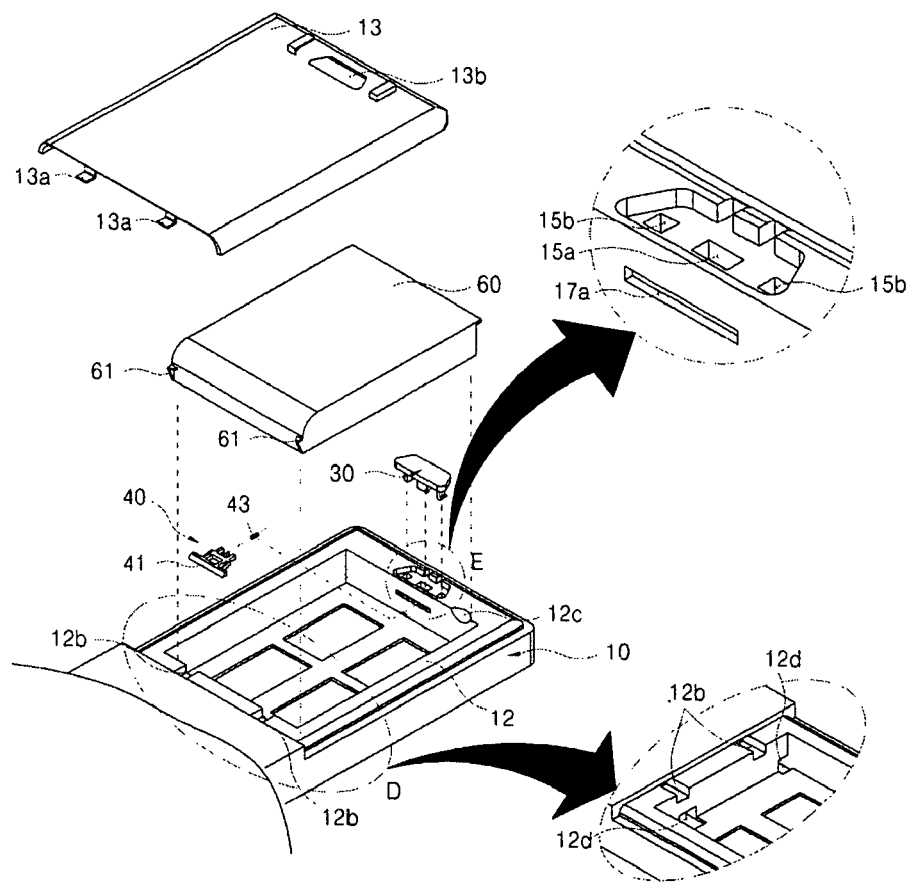
[Figure 5]

[Figure 6]
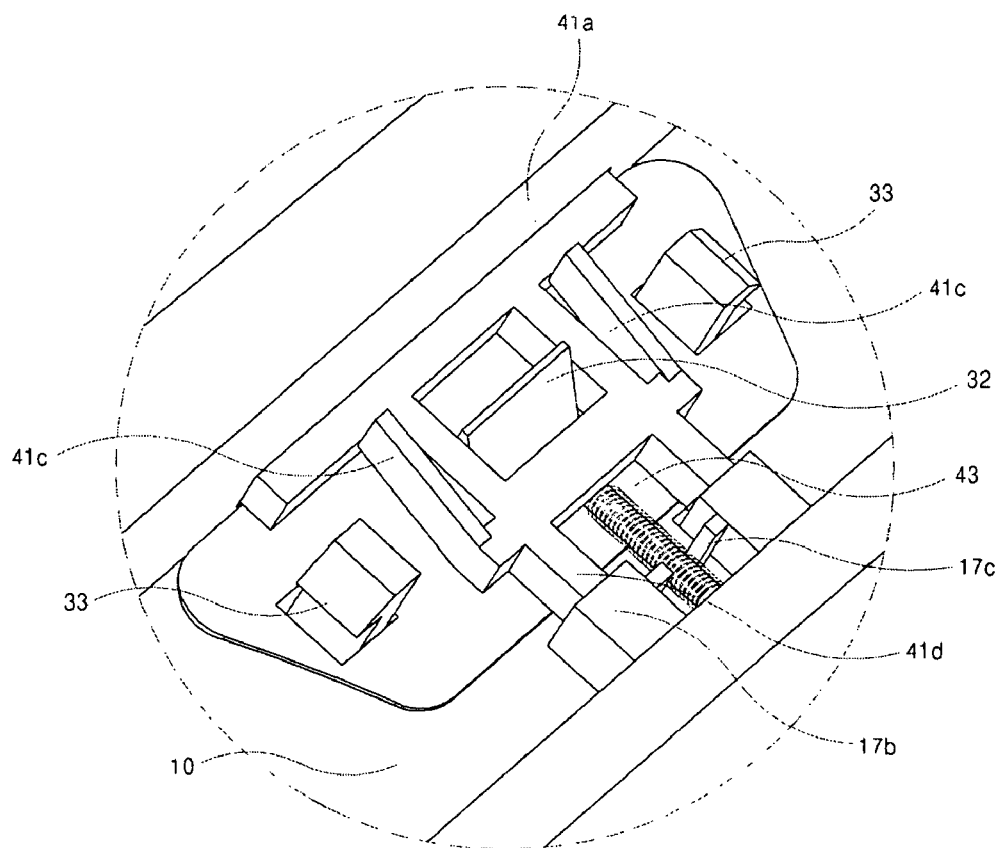

[Figure 7]
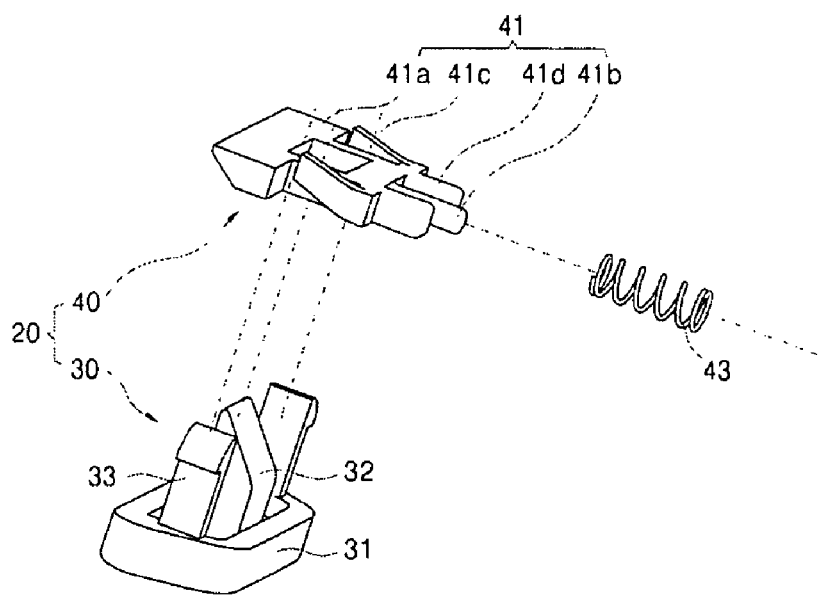
[Figure 8]
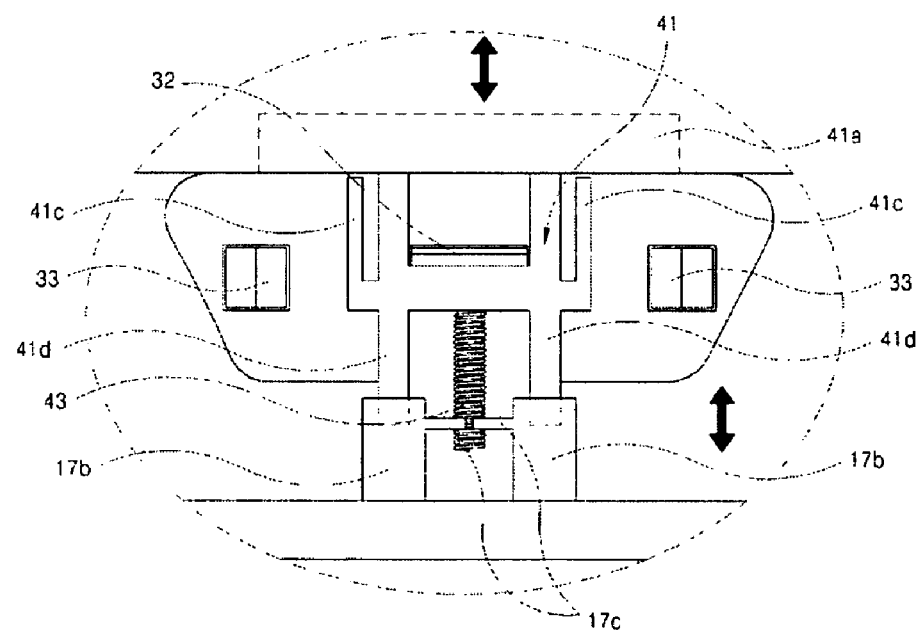

[Figure 9]
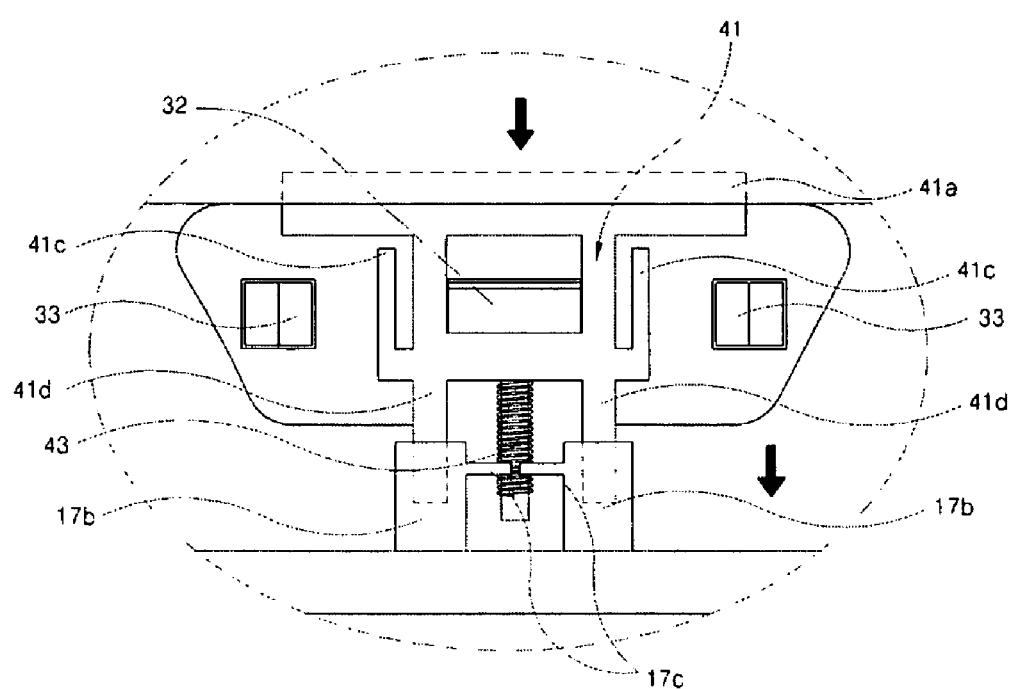

MOBILE TERMINAL

TECHNICAL FIELD

The present invention relates to a mobile terminal, and more particularly, to a mobile terminal capable of simultaneously position a battery cover on a casing and a battery in a battery accommodation portion of the casing using a single operation unit.

BACKGROUND ART

In general, mobile terminals can be freely used during moving without being limited by a place. Mobile communication terminals such as mobile phones and personal digital assistants (PDAs) called personal mobile terminals are typical mobile terminals. Thus, the term "mobile terminal" used in the present specification includes all the above devices. However, for the convenience of explanation, the following description focuses on the PDA.

In a complicated and diversified society, individuals need to store or maintain personal information. To meet such needs, various products are presently released in the market. One of the products is a PDA.

The PDA, called as a pocket computer, refers to all compact devices of a palm size having calculation and information storing and search functions for personal or business use. The PDA is widely used for schedule calendar and address information.

In particular, PDAs for industrial use are widely used especially for logistics industry and the market is gradually growing. The industrial PDA is equipped with various business functions as a barcode scanner and a card checker that is not provided in a general PDA. The industrial PDA has merits of efficient operations of delivery, file management, and related businesses.

For example, in insurance companies, various insurance related businesses such as customer information management, customer search, schedule management, interview records management, celebration data search, and fund account statement process can be directly processed by an insurance agent on the spot using the industrial PDA. In hospitals, not only treatment records, medical history, and prescriptions of a patient but also images such as an X-ray image and graphic materials can be input or searched for using the industrial PDA carried by medical staffs without limits in time and place. Also, in the business of police, the outside control business of traffic policemen and night guards is performed using the industrial PDA so that fines for violations of traffic regulations that must be paid 2-3 days after the issue of a fine can be instantly paid at financial institutes. Thus, time for the outside control business can be remarkably reduced.

On the other hand, the mobile terminal a rechargeable battery as a power supply source is installed in a battery accommodation portion of a casing and a battery cover opening/closing a battery accommodation portion is detachably coupled to the casing. Thus, when the mobile terminal is in use, the battery cover is fixed to the casing to protect the battery from an external impact. Also, the battery accommodated in the battery accommodation portion must be in a fixed state so as not to be deviated from the casing. When the battery needs to be separated from the casing to charge or replace the battery, the fixed state of the battery cover and the battery must be easily removed.

According to this need, structures to prevent the escape of the battery and the escape of the battery cover are provided to separate the battery and the battery cover for the replacement of the battery while preventing the escape of the battery and the battery cover.

However, in the conventional mobile terminal, in particular, in the industrial PDA, since the structures to maintain the position of the battery cover and the position of the battery in the battery accommodation portion are separately implemented, the structure of the mobile terminal is complicated. Also, since two steps of operations of separating the battery cover and then the battery are performed, a user has difficulty using the mobile terminal and manufacturing of a slime terminal is difficult.

DISCLOSURE

Technical Problem

To solve the above and/or other problems, the present invention provides a mobile terminal which can simultaneously position a battery cover on a casing and a battery in a battery accommodation portion of the casing, using a single operation unit, so that a user can conveniently use the mobile terminal. Also, since the structure of the mobile terminal is simple, a slim mobile terminal can be manufactured.

Advantageous Effects

According to the present invention, since the battery cover is positioned on the casing and simultaneously the battery is positioned in the battery accommodation portion of the casing using a single operation unit, a user can conveniently use the mobile terminal. Also, since the structure of the mobile terminal is simple, a slim mobile terminal can be manufactured.

DESCRIPTION OF DRAWINGS

FIG. 1 is a front perspective view of a mobile terminal according to an embodiment of the present invention;

FIG. 2 is a rear perspective view of the mobile terminal of FIG. 1;

FIG. 3 is an exploded perspective view of the mobile terminal of FIG. 1;

FIG. 4 is a rear exploded perspective view of an area A of FIG. 3;

FIG. 5 is an exploded perspective view of core parts of FIG. 4;

FIG. 6 is a partially cut-away perspective view of an area C of FIG. 4, viewed from under the drawing sheet;

FIG. 7 is a perspective view of a cover and battery stopper of FIG. 6; and

FIGS. 8 and 9 illustrate the operation of the cover and battery stopper.

BEST MODE

According to an aspect of the present invention, a mobile terminal comprises a casing having a battery accommodation portion where a battery is installed and a battery stopper accommodation groove is recessively formed in a side thereof, a battery cover detachably coupled to the casing to cover the battery accommodation portion and having a cover knob accommodation groove that is formed by penetrating an area thereof, and a cover and battery stopper installed in the casing and having a side that is hookingly coupled to and released from the cover knob accommodation groove and the other side that is forcibly coupled to and released from the battery stopper accommodation groove by being engaged with the operation of the side that is hook coupled to and released from the cover knob accommodation groove.

The cover and battery stopper comprises a cover stopper portion installed in the casing to be capable of being hookingly coupled to and released from the cover knob accommodation groove of the battery cover, and a battery stopper portion installed in the casing to be capable of being forcibly coupled to and released from the battery stopper accommodation groove by being engaged with the operation of the cover stopper portion.

The cover stopper portion is a cover knob coupled to the casing to protrude from a flat surface of a side thereof to be capable of being pushed and ejected with respect to the flat surface, and the battery stopper portion comprises a battery stopper coupled to the casing to be pushed and ejected with respect to the casing toward the battery accommodation portion by being engaged with the pushing and ejection operation of the cover knob, and a spring coupled to the battery stopper and the casing to elastically bias the battery stopper toward the battery accommodation groove.

The batter stopper comprises a battery hook bar capable of being pushed and ejected with respect to the casing toward the battery accommodation portion, a spring support rod extending from the battery hook bar and to which the spring is coupled, a stop plate coupled to the battery hook bar and preventing the battery stopper from being separated from the casing, and a spring guide coupled to the battery hook bar and guiding the movement of the battery stopper.

One side surface of the battery hook bar is inclined such that a cross-section thereof gradually decreases toward an end portion thereof.

The cover knob comprises a pusher protruding from a flat surface of the casing, a pushing pin extending from the pusher and allowing the battery to move to the left and right by contact pressing and releasing the battery stopper during moving up and down, and a hook coupled to the pusher and preventing the pusher from being separated from the casing.

One side surface of the pushing pin bar is inclined such that a cross-section thereof gradually decreases toward a lower end thereof.

A hook hole is formed in a corner area of a lower surface of one side of the battery accommodation portion of the casing, and a hook protrusion protrudes from a corner area of a lower surface of the other side of the battery to be capable of hook coupled to the hook hole.

The mobile terminal is an industrial PDA.

Mode for Invention

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

The present invention can be diversely applied to a mobile terminal such as personal digital assistants, PDAs, including PDAs for industrial use and personal use regardless of whether they are of a flip type or a folder type. In the following description, an industrial PDA of a flip type will be mainly described.

FIG. 1 is a front perspective view of a mobile terminal according to an embodiment of the present invention. FIG. 2 is a rear perspective view of the mobile terminal of FIG. 1. FIG. 3 is an exploded perspective view of the mobile terminal of FIG. 1. FIG. 4 is a rear exploded perspective view of an area A of FIG. 3. FIG. 5 is an exploded perspective view of core parts of FIG. 4. FIG. 6 is a partially cut-away perspective view of an area C of FIG. 4, viewed from under the drawing sheet. FIG. 7 is a perspective view of a cover and battery stopper of FIG. 6. FIGS. 8 and 9 illustrate the operation of the cover and battery stopper.

Referring to the above drawings, the mobile terminal according to the present embodiment, that is, an industrial PDA 1, includes a casing 10 having a battery accommodation portion 12 where a battery 60 is installed, a key pad 11, a printer portion 70 for outputting a predetermined transaction record, a barcode recognition portion 80 for recognizing a barcode attached on an item, a main board 50 installed in the casing 10 and having various circuit parts mounted thereon, and a cover and battery stopper 20 for simultaneously preventing a battery cover 13 for covering the battery accommodation portion 12 from being arbitrarily separated from the casing 10 and the battery 60 from being arbitrarily separated from the battery accommodation portion 12 of the casing 10.

The casing 10, as shown in FIGS. 1-3, includes an upper casing 10*a* and a lower casing 10*b* which can be assembled and disassembled. As the upper casing 10*a* and the lower casing 10*b* are coupled to each other, an accommodation space for accommodating electronic parts is formed. Since the casing 10 can be disassembled into the upper casing 10*a* and the lower casing 10*b* and assembled into one, the main board 50 can be installed in the casing 10 or a maintenance and repair work of various circuit parts can be performed. As shown in FIGS. 1 and 3, a guide 14 having a shape of a groove as wide as the thickness of a magnetic card (M/C, not shown) to allow the M/C can slide along the groove is formed on a front surface of the upper casing 10*a*. User information of the M/C is read as the M/C slides along the guide 14. The guide 14 is formed by a guide wall (not shown) formed on a rear surface of the upper casing 10*a*.

The keypad 11 is coupled to a lower area of the front side of the upper casing 10*a* and an opening for a screen is formed in a predetermined area adjacent to the keypad 11. A liquid crystal display (LCD) is provided in the opening for a screen and used as a display portion 19 for displaying input information or processing steps. In addition to the LCD, a plasma display panel (PDP) or an organic light emitting diode (OLED) can be used as the display portion 19.

The lower casing 10*b* is coupled to the upper casing 10*a* to face each other to form the accommodation space for accommodating electronic parts with the upper casing 10*a*. As shown in FIG. 3, the main board 50 is installed in the accommodation space such that the main board 50 is fixed to the upper casing 10*a* in the accommodation space.

The printer portion 70 is provided in an upper area of the front side of the upper casing 10*a*. The printer portion 70 outputs a predetermined transaction record onto a sheet of paper. Thus, the printer portion 70 outputs the content of use of the M/C or a receipt of an item recognized by the barcode recognition portion 80.

An opening window for a barcode scanner (not shown) as the barcode recognition portion 80 is provided in the upper portion of the lower casing 10*b*. The barcode scanner installed in the accommodation space can be implemented as a camera or a laser. To read a barcode of an item, the barcode scanner is installed such that one side surface thereof for reading the barcode faces the outside, that is, a window open at an end portion of the lower casing 10b. A cover 81 in a predetermined color is installed at the open window of the lower casing 10b.

As shown in FIGS. 4 and 5, the battery accommodation portion 12 where the battery 60 electrically connected to the main board 50 to apply a power source to the main board 50 is installed is provided on a read surface of the lower casing 10b. The battery 60 is generally a secondary battery that is rechargeable and replaceable. A battery stopper accommodation groove 62 is provided at one side of the battery 60 and a hook protrusion 61 protrudes from a corner area of the lower surface at the other side of the battery 60.

A coupling groove 12b is provided in the battery accommodation portion 12 to be recessed in the lower casing 10b as large as the battery 60. A coupling rib 13a of the battery cover 13 is inserted in the coupling groove 12b so that the battery cover 13 that will be described later can be slidingly coupled to the battery accommodation portion 12. Also, as shown in a magnified portion D of FIG. 5, a hook hole 12d is formed in a corner area of the lower surface of one side of the battery accommodation portion 12 so that the hook protrusion 61 of the battery 60 is hookingly coupled to the hook hole 12d. As the hook protrusion 61 of the battery 60 is coupled to the hook hole 12d of the battery accommodation portion 12 and the battery stopper portion 40 is forcibly coupled to the battery stopper accommodation groove 62, the battery 60 is firmly fixed in the battery accommodation portion 12. A portion where the battery stopper portion 40 is forcibly coupled to the battery stopper accommodation groove 62 will be described in detail later.

Also, to facilitate replacement of the battery 60 positioned in the battery accommodation portion 12, as shown in FIGS. 4 and 5, a catch groove 12c is formed in the battery accommodation portion 12 so that the battery 60 can be easily lifted and separated using the tip of a finger.

The battery cover 13 is detachably coupled to the battery accommodation portion 12 to open and close the battery accommodation portion 12. As shown in FIGS. 4 and 5, the battery cover 13 is coupled to the casing 10 as the coupling rib 13a is slidingly coupled to the coupling groove 12b of the battery accommodation portion 12. Thus, if the battery cover 13 coupled to the battery accommodation portion 12 is prevented from sliding with respect to the casing 10, the battery cover 13 is not easily separated from the casing 10. A cover knob accommodation groove 13b performs such a role.

The cover knob accommodation groove 13b penetrates the battery cover 13. When the battery cover 13 is coupled to the casing 10 by sliding in the battery accommodation portion 12, a cover knob 30 of the cover and battery stopper 20 that will be described later is hookingly coupled to the cover knob accommodation groove 13b.

The cover and battery stopper 20 includes a cover stopper portion 30, that is, the cover knob 30 in the present embodiment, installed at the casing 10 to be capable of being hookingly coupled to or separated from the cover knob accommodation groove 13b of the battery cover 13 and the battery stopper portion 40 installed at the casing 10 to be forcibly coupled to and separated from the battery stopper accommodation groove 62 by being engaged with the operation of the cover stopper portion 30.

The cover stopper portion 30 is the cover knob 30 coupled to a flat surface of one side of the casing 10 to protrude therefrom, and capable of being pushed and ejected with respect to the flat surface. The cover knob 30 includes a pusher 31 protruding from the flat surface of the battery accommodation portion 12, a pushing pin 32 extending from the pusher 31 and pressing and releasing a battery stopper 41 that will be described later, and a hook 33 coupled to the pusher 31 and preventing the pusher 31 from being separated from the casing 10.

The pusher 31 is a portion pressed by a finger or an inner surface of the battery cover 13. The pusher 31 protrudes from the flat surface of the casing 10 to be able to be pushed and ejected with respect to the flat surface of the battery accommodation portion 12. That is, the pusher 31 is normally coupled to the casing 10 in a state of protruding from the flat surface of the casing 10. When the battery stopper 41 approaches the battery accommodation portion 12 by a spring 43 of the battery stopper 41 that will be described later, since the pushing pin 32 is configured to move upward, the pusher 31 protrudes from the flat surface of the casing 10 if an external force is not applied. The upper surface of the pusher 31 has a slightly flat structure to be pressed using a finger. When a user presses the pusher 31, the pushing pin 32 overcomes an elastic force of the spring 43 to allow the battery stopper 41 to retreat toward the batter accommodation portion 12. Thus, a battery hook bar 41a is released from the battery stopper accommodation groove 62.

The pushing pin 32 is coupled to a pushing pin hole 15a of the casing 10 and moved up and down due to a pressing force applied to the pusher 31, thereby pressing the battery stopper 41. The one side of an end portion of the pushing pin 32 is inclined such that the cross section thereof gradually decreases toward the lower end. Thus, due to the shape of the pushing pin 32, as shown in FIGS. 7-9, when pushing the battery stopper 41, the pushing pin 32 slidingly contacts the battery stopper 41 and allow the battery stopper 41 to approach and retreat from the battery accommodation portion 12.

The hook 33 is provided at either side of the pushing pin 32 and coupled to the hook hole 12d to prevent the pusher 31 from being separated from the casing 10, as shown in a magnified portion E of FIG. 5.

As described above, the cover knob accommodation groove 13b penetrates the battery cover 13 to be coupled to the cover knob 30 of the battery cover 13. In the present embodiment, the cover knob accommodation groove 13b has a shape corresponding to the pusher 31 of the cover knob 30 and penetrates the flat surface of the battery cover 13. When the battery cover 13 slidingly moves with respect to the casing 10 and is coupled to the casing 10, the cover knob 30 is coupled to the cover knob accommodation groove 13b.

In detail, while the battery cover 13 is slidingly coupled to the battery accommodation portion 12, the cover knob 30 is pressed by the inner surface of the battery cover 13 so as to be in a state of being pushed with respect to the flat surface of the battery accommodation portion 12. Then, when the coupling rib 13a of the battery cover 13 is inserted in the coupling groove 12b of the battery accommodation portion 12, the cover knob 30 that is in a state of being pressed by the inner surface of the battery cover 13 is elastically restored by the elastic force of the spring 43 of the battery stopper 41, which will be described later, and thus coupled to the cover knob accommodation groove 13b.

In a state in which the cover knob 30 is coupled to the cover knob accommodation groove 13b, when the battery cover 13 is to be separated from the battery accommodation portion 12 in the reverse direction, the battery cover 13 cannot be separated by slidingly moving with respect to the casing 10 in the reverse direction. If the battery cover 13 is to be separated from the battery accommodation portion 12, the cover knob 30 is pressed to release the pusher 31 from the cover knob accommodation groove 13b and then the batter cover 13 is slidingly moved.

Accordingly, the battery cover 13 can be fixedly positioned by preventing the battery cover 13 from being arbitrarily separated from the casing 10 by using the cover stopper portion 30 of the cover and battery stopper 20. The position of the battery 60 is fixed by the battery stopper 40 of the cover and battery stopper 20.

The battery stopper portion 40, as shown in FIGS. 4-6, includes the battery stopper 41 coupled to the casing 10 and moving in a hook bar coupling hole 17a toward the battery accommodation portion 12 to be capable of being pushed and ejected with respect to the casing 10 by being engaged with the moving in and out operations of the cover knob 30, and a spring 43 coupled to the battery stopper 41 and the casing 10 and elastically biasing the battery stopper 41 toward the battery stopper accommodation groove 62.

In the present embodiment, the battery stopper 41, as shown in FIGS. 7 and 8, includes the battery hook bar 41a forcibly coupled to the battery stopper accommodation groove 62, a spring support rod 41d extending from the battery hook bar 41a and to which the spring 43 is coupled, a stop plate 41c preventing the battery stopper 41 from being separated from the casing 10, and a spring guide 41d coupled to the battery hook bar 41a and guiding the movement of the battery stopper 41.

The battery hook bar 41a is a portion directly and forcibly coupled to the battery stopper accommodation groove 62 formed in the battery 60 and has an upwardly inclined shape, that is, the cross-section of the battery hook bar 41a gradually decreases toward the end portion thereof. Thus, when the battery hook bar 41a is coupled to the battery stopper accommodation groove 62, the battery hook bar 41a prevents the battery 60 from being arbitrarily separated from the battery stopper accommodation groove 62.

The spring 43 is coupled to the spring support rod 41b to provided the elastic force of the spring 43 to the battery hook bar 41a. The stop pin 41c prevents the battery stopper 41 elastically biased toward the battery accommodation portion 12 from being separated by the spring 43. The spring guides 41d is provided in a pair at both sides of the spring support rod 41b and, as shown in FIGS. 6-9, coupled to a guide wall 17b to guide the movement of the battery stopper 41.

The spring 43 is supported by a spring support 17 and coupled to the battery stopper 41 and elastically biases the battery stopper 41 toward the inside of the battery accommodation portion 12. As the spring 43 contracts and expands, the stopper portion 40 and the cover stopper portion 30 are operated by being engaged with each other.

The method of using the cover and battery stopper in the mobile terminal, that is, the industrial PDA 1, configured as above, and the operation of the industrial PDA 1, will be described below.

In the process of installing the battery 60 in the battery accommodation portion 12 to use the industrial PDA 1, the battery 60 is accommodated in the battery accommodation portion 12 in a state in which the battery cover 13 is separated from the casing 10. The hook protrusion 61 of the battery 60 is inserted in the hook hole 12d of the battery accommodation portion 12 and the cover knob 30 is pressed while lowering the battery 60 at the side where the battery stopper accommodation groove 62 is located. When the cover knob 30 is pressed, the pushing pin 32 of the cover knob 30 presses the battery stopper 41 to allow the battery stopper 41 to retreat from the battery accommodation portion 12. Accordingly, the battery hook bar 41a of the battery stopper 41 retreats from the battery accommodation portion 12 and enters into the casing 10 so that the battery 60 is accommodated in the battery accommodation portion 12. That is, since one side of the pushing pin 32 of the cover knob 30 has an inclined surface and contacts the battery stopper 41, as the pushing pin 32 moves downwardly, the battery stopper 41 is moved farther from the battery accommodation portion 12. Thus, the battery hook bar 41a enters into the casing 10 so that the battery 60 can be safely accommodated in the battery accommodation portion 12.

In this state, when a force applied to the cover knob 30 is removed, the spring 43 of the battery stopper portion 40 presses the battery stopper 41 toward the battery accommodation portion 12 so that the battery stopper 41 moves toward the battery accommodation portion 12. Thus, the pushing pin 32 of the cover knob 30 is moved upward. The battery hook bar 41a of the battery stopper 41 is moved toward the battery accommodation portion 12 so as to be forcibly coupled to the battery stopper accommodation groove 62 of the battery 60. Thus, the battery 60 is maintained at a regular position.

Then, when the battery cover 13 is installed in the casing 10, the coupling rib 13a of the battery cover 13 is coupled to the coupling groove 12b and then the portion of the battery cover 13, where the cover knob accommodation groove 13b is formed, is pushed down to allow the cover knob accommodation groove 13b to be coupled to the cover knob 30. If necessary, the cover knob 30 can be well coupled to the cover knob accommodation groove 13b by pressing the cover knob 30. In doing so, the battery hook bar 41a may retreat from the battery stopper accommodation groove 62. However, the above retreat does not matter because the forcible coupling between the battery stopper accommodation groove 62 and the battery hook bar 41a is temporarily removed. When the cover knob 30 is accommodated in the cover knob accommodation groove 13b by removing the force applied to the cover knob 30, the battery hook bar 41a is coupled to the battery stopper accommodation groove 62. Since the battery cover 13 is not taken downwardly in a state in which the cover knob 30 is coupled to the cover knob accommodation groove 13b, the battery cover 13 is not separated from the casing 10.

As described above, since the battery 60 and the battery cover 13 are fixedly positioned by the battery stopper portion 40 and the cover stopper portion 30 of the cover and battery stopper 20 that is a single operation unit, the industrial PDA 1 can be safely used.

To replace the battery 60 in an assembled state, the coupling between the cover knob 30 and the cover knob accommodation groove 13b is removed by pressing the cover knob 30 so that the battery cover 13 is separated from the casing 10 to allow the battery cover 13 to be taken downwardly. Also, in a state in which the cover knob 30 is pressed, the battery hook bar 41a is released from the battery stopper accommodation groove 62 so that the battery 60 can be easily separated from the battery accommodation portion 12.

As described above, when the cover knob 30 that is the cover stopper portion 30 only is operated, the battery cover 13 can be separated from the casing 10. Also, in the engagement with the above operation, the battery hook bar 41a of the battery stopper portion 40 can be separated from the battery stopper accommodation groove 62. Thus, since the forcible and hook couplings between the battery 60 and the battery cover 13 are all removed with the operation of the cover knob 30 only, the battery 60 and the battery cover 13 can be easily replaced so that a user can conveniently use the mobile terminal. Also, since the structure of the mobile terminal is simple, manufacturing of a slim mobile terminal is possible.

In the above embodiment, although the industrial PDA 1 is described in detail, the technical concept of the present invention can be applied to various mobile terminals such as mobile phones.

While this invention has been particularly shown and described with reference to preferred embodiments thereof, it will be understood by those skilled in the art that various changes in form and details may be made therein without departing from the spirit and scope of the invention as defined by the appended claims.

Industrial Applicability

According to the present invention, since the battery cover can be installed in the casing an simultaneously the battery can be installed in the battery accommodation portion of the casing with a single operation unit, a user can conveniently use the mobile terminal. Furthermore, since the structure of the mobile terminal is simple, manufacturing of a slim mobile terminal is possible.

The invention claimed is:

1. A mobile terminal comprising:
a casing having a battery accommodation portion where a battery is installed and a battery stopper accommodation groove is recessively formed in a side thereof;
a battery cover detachably coupled to the casing to cover the battery accommodation portion and having a cover knob accommodation groove that is formed by penetrating an area thereof; and
a cover and battery stopper installed in the casing and having a side that is hookingly coupled to and released from the cover knob accommodation groove and the other side that is forcibly coupled to and released from the battery stopper accommodation groove by being engaged with the operation of the side that is hook coupled to and released from the cover knob accommodation groove,
wherein the cover and battery stopper comprises:
a cover stopper portion installed in the casing to be capable of being hookingly coupled to and released from the cover knob accommodation groove of the battery cover; and
a battery stopper portion installed in the casing to be capable of being forcibly coupled to and released from the battery stopper accommodation groove by being engaged with the operation of the cover stopper portion, and
wherein the cover stopper portion is a cover knob coupled to the casing to protrude from a flat surface of a side thereof to be capable of being pushed and ejected with respect to the flat surface, and the battery stopper portion comprises:
a battery stopper coupled to the casing to be pushed and ejected with respect to the casing toward the battery accommodation portion by being engaged with the pushing and ejection operation of the cover knob; and
a spring coupled to the battery stopper and the casing to elastically bias the battery stopper toward the battery accommodation groove.

2. The mobile terminal of claim 1, wherein the batter stopper comprises:
a battery hook bar capable of being pushed and ejected with respect to the casing toward the battery accommodation portion;
a spring support rod extending from the battery hook bar and to which the spring is coupled;
a stop plate coupled to the battery hook bar and preventing the battery stopper from being separated from the casing; and
a spring guide coupled to the battery hook bar and guiding the movement of the battery stopper.

3. The mobile terminal of claim 2, wherein one side surface of the battery hook bar is inclined such that a cross-section thereof gradually decreases toward an end portion thereof.

4. The mobile terminal of claim 1, wherein the cover knob comprises:
a pusher protruding from a flat surface of the casing;
a pushing pin extending from the pusher and allowing the battery to move to the left and right by contact pressing and releasing the battery stopper during moving up and down; and
a hook coupled to the pusher and preventing the pusher from being separated from the casing.

5. The mobile terminal of claim 4, wherein one side surface of the pushing pin bar is inclined such that a cross-section thereof gradually decreases toward a lower end thereof.

6. The mobile terminal of claim 1, wherein a hook hole is formed in a corner area of a lower surface of one side of the battery accommodation portion of the casing, and a hook protrusion protrudes from a corner area of a lower surface of the other side of the battery to be capable of hook coupled to the hook hole.

7. The mobile terminal of claim 1, being an industrial PDA.

* * * * *